(12) United States Patent
Villavicencio Montemayor et al.

(10) Patent No.: US 9,988,566 B2
(45) Date of Patent: Jun. 5, 2018

(54) HYDROPHOBIC SILICONE-BASED PUTTY COMPOSITION

(71) Applicant: Raul Marmolejo Velez, García (MX)

(72) Inventors: Alejandra Villavicencio Montemayor, García (MX); Graciela Yaniz Guzmán Acosta, García (MX)

(73) Assignee: Raul Marmolejo Velez, Garcia (MX)

( * ) Notice: Subject to any disclaimer, the term of this patent is extended or adjusted under 35 U.S.C. 154(b) by 0 days. days.

(21) Appl. No.: 15/361,131

(22) Filed: Nov. 25, 2016

(65) Prior Publication Data

US 2017/0152420 A1    Jun. 1, 2017

Related U.S. Application Data

(60) Provisional application No. 62/260,461, filed on Nov. 27, 2015.

(51) Int. Cl.
  *C08L 83/04*    (2006.01)
  *C09K 3/10*    (2006.01)

(52) U.S. Cl.
  CPC ............ *C09K 3/1018* (2013.01); *C08L 83/04* (2013.01); *C08L 2205/025* (2013.01); *C08L 2205/06* (2013.01); *C09K 2003/1081* (2013.01); *C09K 2200/0239* (2013.01); *C09K 2200/0247* (2013.01); *C09K 2200/047* (2013.01); *C09K 2200/0447* (2013.01)

(58) Field of Classification Search
None
See application file for complete search history.

(56) References Cited

U.S. PATENT DOCUMENTS

| | | | |
|---|---|---|---|
| 5,093,389 A * | 3/1992 | Shimizu | C08L 63/00 523/210 |
| 5,319,021 A | 6/1994 | Christy | |
| 6,238,473 B1 | 5/2001 | Maxwell et al. | |
| 7,434,812 B2 * | 10/2008 | Wrobleski | C09D 5/34 277/312 |
| 8,454,773 B2 | 6/2013 | Cisneros | |
| 8,986,438 B2 * | 3/2015 | Merrifield | C09J 167/00 106/266 |
| 2014/0024761 A1 * | 1/2014 | Kasahara | C08K 3/26 524/425 |

\* cited by examiner

*Primary Examiner* — Melvin C Mayes
*Assistant Examiner* — Colette Nguyen
(74) *Attorney, Agent, or Firm* — The Morales Law Firm, LLC; Joseph L. Morales

(57) ABSTRACT

A putty composition comprising an organic binder, which further comprises a silicone fluid, an anti-blocking agent, and a rheological additive. The putty also contains a filler. The non-staining putty composition meets the ASTM-D2203 standard test method for staining sealants.

20 Claims, No Drawings

HYDROPHOBIC SILICONE-BASED PUTTY COMPOSITION

CROSS-REFERENCE TO RELATED APPLICATION

This application claims the benefit of U.S. Provisional Patent Application Ser. No. 62/260,461, entitled "HYDROPHOBIC SILICONE BASED PUTTY COMPOSITION" and filed Nov. 27, 2015, the entire disclosure of which is incorporated herein by reference.

BACKGROUND OF THE INVENTION

Field of the Invention

This invention relates to the field of a putty composition that can be used in the installation of drain pipes, sinks, faucets, and bath fixtures, and kitchen surfaces made of porous stone such as marble and granite, to create a watertight seal and prevent leaks and seepage, and that will not permanently damage porous surfaces by not leaving behind a yellowish stain due its being formulated without any natural or hydrocarbon oils. More specifically, the present disclosure relates to a hydrophobic silicone-based non-staining putty composition.

Background

Plumber's putty is a well-known product in the plumbing and construction industry to seal fixtures in bath and kitchen areas, such as faucets, tub strainers, and sinks. This putty composition is well-known to be waterproof, adhesive, and easily manipulated by hand to be molded into any shape; it remains soft and flexible, and will not shrink or crack before or after being installed. Typical plumber's putty consists of inert fillers and a liquid portion that may contain hydrocarbon oils and natural oils. Traditionally fish oil was used for this application, Fish oil contains a variety of polyunsaturated acids, including docosenoic acid as the main component, and some others, usually of the C-22 carbon chain variety. In other embodiments, vegetable oils are used for this application, most commonly blown castor oil. The fatty acid chains present in castor oil include about 70% ricinoleic acid, a C-18 carbon chain acid. Due to the oils present in the typical composition of plumber's putty, the product makes a permanent yellowish stain around the installation area when applied on any kind of porous surfaces because of the migration of the oils out of the putty over the uncovered surface. This makes the product unsuitable for installations on marble, granite, or any other porous material.

There are a variety of techniques used by plumbers to prevent the staining caused by plumber's putty; some plumbers recommend the application of an acrylic coat to the surface on which the installation will take place, but this does not guarantee that the oil will not migrate over time to the untreated stone. Another alternative to protect the stone is to apply a stone sealer, but this is a very expensive product and requires a long time to dry and cure. Some stone sealers can also cause a discoloration that can result in a non-homogeneous color in the whole piece of the stone.

U.S. Pat. No. 7,434,812 (the '812 patent), incorporated by reference herein in its entirety, describes a putty that substitutes the use of vegetable and hydrocarbon oils with a silicone rubber, a polymeric plasticizer, and some clays, such as montmorillonite, kaolin clay, bentonites, and any other type of natural or synthetic clays. These clays have a high shrink-swell capacity, resulting in cracking which is a risk of the product to fail when it is not well-kneaded.

Viscosity or viscosity ranges of silicone compounds do not determine if they are classified as gums, rubbers, or fluids. Classification depends on the chemical structure of the polymeric chains. Silicone gum is a clear, high-molecular-weight polydimethyldiphenylvinyl-siloxane that can be compounded and vulcanized by normal silicone rubber procedures. Silicone rubbers are inorganic synthetic elastomers made from a cross-linked silicone-based polymer. Silicone rubber is a polymeric material with the consistency of gum. More specifically, silicone rubbers are inorganic synthetic elastomers of high molecular weight, typically polydimethyldiphenylvinyl-siloxane, which can be compounded and vulcanized by normal silicone rubber procedures. This material can be difficult to manufacture due to its rubbery properties, and its inclusion in the putty composition increases the risk of the product failing. In addition, this composition is an expensive alternative in comparison with the oil-based putty, making its use more suitable for luxury applications, porous stone applications, or where staining could be permanent.

U.S. Pat. No. 8,986,438 (the '438 patent), incorporated by reference herein in its entirely, describes another attempt to make an affordable product and to reduce the risk of staining a porous surface by replacing the rubbery component with vegetable oil and adding zeolites to absorb the oil, preventing its migration to the stone's surface. But is has been found that this composition does not guarantee that the product will not cause permanent damage to the marble or to any other natural porous stone, because staining can occur as long as there is any, or combination of, natural, synthetic, and hydrocarbon oils.

SUMMARY OF THE INVENTION

The present non-staining putty composition provides a solution to the above and other problems by providing a putty composition comprising an organic binder, which further comprises a silicone fluid, an anti-blocking agent, and a rheological additive. The putty also contains a filler. The non-staining putty composition meets the ASTM-D2203 standard test method for staining sealants. In a preferred embodiment, the putty composition contains polydimethylsiloxane (PDMS) as the silicone fluid. The silicone fluid in some embodiments is a blend of high viscosity and low viscosity silicones. In some preferred embodiments, the preferred blend is 70% w/w high viscosity silicone and 30% w/w low viscosity silicone. In a further preferred embodiment, the blend is 95% w/w high viscosity silicone and 5% w/w low viscosity silicone.

The putty, in other preferred embodiments include anti-blocking agents selected, for example, from stearic acid in a concentration of 1 to 13% by weight; ethylene-bis(stearamide)(EBS wax) (a concentration of up to 18% by weight), docosanamide (in a concentration of up to 12% by weight), and magnesium stearate (in a concentration of up to 18% by weight). In a further embodiment, the putty includes a rheological additive such as castor oil.

The putty further includes a particulate filler, which is selected, for example, from calcium carbonate and fumed silica in a concentration of 60 to 80% by weight. In some embodiments, the particulate filler has a particle size ranging between 2 and 10 microns, more preferably 3 to 5 microns. In yet a further embodiment, the particulate filler has a specific gravity of 2 to 3, more preferably 2.3 to 2.7. The putty of the present invention meets the ASTM-D2203 standard if two or fewer filter papers show any evidence of staining.

DETAILED DESCRIPTION

The invention summarized above and defined by the enumerated claims may be better understood by referring to the following description, which should be read in conjunction with the accompanying claims. This description of an embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention.

The present invention of a non-staining putty composition provides a solution to the above and other problems by providing an affordable and truly non-staining putty composition for the plumbing industry. It removes the risk of staining on porous surfaces by eliminating the use of any kind of vegetable oil, hydrocarbons, rubbers, or polymeric plasticizers. In addition, by replacing the use of clays such as montmorillonite, hectorite, kaolin, and bentonites with a thixotropic agent that is obtained by a derivate extracted from castor oil, the shrink-swell property is also eliminated.

This invention relates to a non-staining putty composition formulated to pass ASTM-D2203—Standard Test Method for Staining from Sealants. The putty composition of this invention comprises at least one organic binder and at least one inorganic filler.

Organic Binder

The organic binder of this composition comprises a blend of silicone fluids, an anti-blocking agent, and a rheological additive.

The main silicone fluid structures are linear polydimethylsiloxane (PDMS). The chains of a PDMS fluid can contain more than 1,000 silicone atoms; the longer the chain, the greater the degree of polymerization, the higher the molecular weight, and the higher the viscosity of the fluid. PDMS fluids provide strength, stability, and flexibility to the putty and also the lubricity and the water-repellency that the product requires. The preferred silicone fluids for use in this invention are a blend of PDMS of a very high viscosity with another of a very low viscosity. High viscosity PDMS as contemplated herein means PDMS with a viscosity of 10,000 to 1,000,000 cSt (centistokes). Low viscosity PDMS relates to PDMS with a viscosity of 10 to 5,000 cSt.

The blend is at least 70% w/w high viscosity silicone fluid and 30% w/w low viscosity silicone fluid (preferably 95% w/w high viscosity silicone fluid and 5% w/w low viscosity silicone fluid). The silicone fluids act as an adhesion promoter on the surface on which the putty is applied and also help to bind all the solids and other ingredients while being mixed.

Another organic compound that can be added to this composition is stearic acid. This compound is used as a process aid and provides a partial reduction of the stickiness of the silicone fluids, allowing the non-staining putty composition to be easily molded by hand and still be capable of sealing while being used in plumbing repairs and installations. Another preferred composition includes all or combinations of some other anti-blocking agents, such as ethylene-bis(stearamide) (EBS wax), docosonamide, and magnesium stearate.

As explained above, the non-staining putty composition comprises at least one of the following anti-blocking agents: stearic acid in a concentration of 1 to 13% by weight, ethylene-bis(stearamide) (EBS wax) in a concentration of up to 18% by weight, docosonamide in a concentration of up to 12% by weight, and magnesium stearate in a concentration of up to 18% by weight. The anti-blocking agent reduces the silicone fluid's thickness. It makes the final product easier to manipulate and prevents leaving residue when applied.

In addition to the organic binder, the composition can optionally contain other kinds of compounds, such as a derivate of castor oil that provide the thixotropic property to the putty and acts as a rheological additive that provides a certain degree of smoothness and stability to the putty.

Fillers

In some preferred embodiments, particulate filler is included in the non-staining putty composition of the present invention. The basic function of this filler is to act as an extender, adding body and bulk to the product. Calcium carbonate, widely used as filler in plastics, improves the tensile strength and elongation properties that impact the performance of sealing compounds such as putties and caulking compounds. Calcium carbonate is a high-density filler and is commonly used for this purpose due to good performance and low cost. In a preferred embodiment, calcium carbonate that has been previously surface treated with stearic acid is utilized. Such surface treated calcium carbonate has enhanced hydrophobic properties, which are preferred in one embodiment of the present invention. It is contemplated that other types of surface treated calcium carbonate can be utilized, which provide such enhanced hydrophobic properties.

The preferred inorganic fillers are added to the composition in a concentration of 60-80% by weight, and are any type of ground or precipitated calcium carbonate with a particle size range of 2 microns to 10 microns, but preferably 3 to 5 microns, with a specific gravity between 2 and 3, preferably 2.3 to 2.7. In one preferred embodiment, the inorganic fillers include calcium carbonate and fumed silica with specific gravities of 2.7 and 2.3 respectively.

The second filler that can be added to the composition is fumed silica (also known as amorphous silicon dioxide), which is used as a flow and anticaking agent to prevent the calcium carbonate agglomerates during the mixing process and which facilitates processing by ensuring flowability of powders and minimizing caking of the bulk fillers in the composition.

Rheological Additives

Rheological additives with thixotropic properties are utilized. A rheological additive with thixotropic properties provides the putty with the ability to change its fluidity overtime. The preferred types of rheological additives are derivatives of castor oil and other castor wax products, such as Thixatrol® and Thixcin® from Elementis Specialties. Other rheological additives may include any powered thixtropic agent based on amide wax for example the Disparlon® series applied as Anti-Slumping agent for sealants and Adhesives, manufactured by Kusumoto Chemiclas, Ltd. In one preferred embodiment, that the preferred rheologcal additive is the product obtained of the reaction of decanoic acid, 12-hydroxystearic acid and 1,2-ethediamine. The preferred rheological additive is present in a concentration of 1 to 2% by weight.

EXAMPLES

The non-staining putty composition is manufactured using mixing equipment that is well-known in the industry.

The preferred mixing system for this invention is a horizontal blender with a paddle mixer system or a sigma system. For a 110-pound batch to be manufactured in a paddle mixer with a 5 hp motor, the components are added in the following sequence: First a fraction of the inorganic minerals is blended with a portion of the liquids preferably the fumed silica and the rheological additive with the low viscosity PDMS. This is then followed by the rest of the liquids; the high viscosity PDMS and the rest of bulk fillers; and finally the calcium carbonate and the anti-blocking agent. The ratio of the liquids to solids ranges from 1:3 to 1:5.

In one preferred embodiment, fumed silica used for sold under the name SIPERNAT® 22S supplied by Evonik Industries AG is used. In a preferred embodiment, calcium carbonates used are treated with stearic acid to obtain a coat on the surface of the particles of calcium carbonate that provide a higher level of hydrophobicity. One example of a preferred calcium carbonate used in the present invention is the OMYACARB® 4T calcium carbonate supplied by Omya A.G. Using this type of calcium carbonate there is no need to add the stearic acid to the putty composition. This results in a reduction of the cost of the composition and also removes a step from the manufacturing process. The silicone fluids preferred for this invention are the PMX-200 series supplied under the The XIAMETER® brand from Dow Corning Corporation. In addition to the fumed silica and calcium carbonate as inorganic fillers, good example of a preferred thixotropic agent that acts as a rheological modifier is a compound obtained by an organic modification of a castor oil derivate commercially called THIXATROL® GST supplied by Elementis Specialties, Inc.

Table 1 provides examples of the non-staining putty composition of the disclosure. All examples were validated by testing in accordance with ASTM-D2203-Standard Test Method for Staining from Sealants and Fed. Spec. A-A-3110 for Plumbing Fixture Setting Compound.

TABLE 1

| Components | Example 1 | Example 2 | Example 3 | Example 4 | Example 5 |
|---|---|---|---|---|---|
| PDMS of 100,000 to 500,000 cSt | 15 | 15 | 15 | 15 | 15 |
| PDMS of 100 to 400 cSt | 10 | 10 | 10 | 10 | 10 |
| Stearic acid | 3 | | | | 6 |
| Ethylene bis stearamide (EBS) | | 5.5 | | | 2 |
| Docosanamide | | | 3 | | |
| Magnesium stearate | | | | 2 | |
| Calcium carbonate | | | | | 58 |
| Calcium Carbonate treated with stearic acid | 62.5 | 60 | 62.5 | 65.5 | |
| Fumed silica | 7.5 | 7.5 | 7.5 | 7.5 | 7 |
| Thrixotrol GST | 2 | 2 | 2 | 2 | 2 |

The composition of this invention is formulated to pass the standard ASTM-D2203-Standard Test Method for Staining from Sealants. In accordance with this test, 10 sheets of filter paper are stapled together. A brass ring of 19 mm inside diameter and 19 mm high is placed on the center of the filter papers. The ring is then filled with the material to test—in this case the non-staining putty composition. A piece of aluminum foil is placed at the top of the ring and then a 300-gram weight on top of that. The filled ring is allowed to stand for 72 hours at 23±2° C., after which the putty and the ring are removed with a spatula. Every sheet of filter paper is visually examined for evidence of staining by holding it up to a light. A plumber's putty is considered non-staining in accordance with this test if two or fewer filter papers show any evidence of staining. The present invention surpasses the standard because when manufactured as described above, none of the filter papers were stained while performing this test.

Another performance test was conducted on the composition to ensure that the product results of this invention do not leave a visible stain around the putty after being applied. For this test, 10 grams of the non-staining putty composition were applied on porous surfaces such as marble and granite for 96 hours. In contrast to a regular commercially available plumber's putty, there was no perceptible migration of any stain around the putty. As understood in this application, the term "putty" refers to a generic term utilized for a material with high plasticity, similar in texture to clay or dough, typically used in domestic construction and repair as a sealant or filler.

The putty of the present invention is utilized in traditional plumber's putty applications. For example, the putty can be applied to clean or dry surfaces to create watertight seals around water pipe connections. It is used when a watertight, yet reversible, seal is preferred. It can also be utilized to seal surfaces and cover cracks to avoid water intrusion. For example the putty can be placed at the base of a faucet where it attaches to a sink in order to create a watertight seal.

The invention has been described with references to a preferred embodiment. While specific values, relationships, materials, and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify these specifics without departing from the invention taught herein. Having now fully set forth the preferred embodiments and certain modifications of the concept underlying the present invention, various other embodiments, as well as certain variations and modifications of the embodiments herein shown and described, will obviously occur to those skilled in the art upon becoming familiar with such underlying concepts. It is intended to include all such modifications, alternatives, and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A composition of matter, comprising:
   a silicone fluid in a concentration of 10 to 30% by weight;
   an anti-blocking agent in a concentration of 1 to 18% by weight;
   and a rheological additive in a concentration of 0.1 to 2% by weight, and
   a filler in a concentration of 60 to 80% by weight, wherein the composition meets ASTM-D2203 standard test method for staining sealants.

2. The composition of claim 1, wherein the silicone fluid is a polydimethylsiloxane (PDMS).

3. The composition of claim 1, wherein the silicone fluid comprises a blend of high viscosity and low viscosity silicone.

4. The composition of claim 3, wherein the high viscosity silicone has a viscosity of between 100,000 cSt and 1,000,000 cSt and the low viscosity silicone has a viscosity of between 10 and 5,000 cSt.

5. The composition of claim 3, wherein the blend comprises at least a 70% w/w of high viscosity silicone and 30% w/w of low viscosity silicone.

6. The composition of claim 5, wherein the blend comprises at least 95% of high viscosity silicone and 5% w/w of low viscosity silicone.

7. The composition of claim 1, wherein the rheological additive comprises at least one of castor oil and castor oil derivatives.

8. The composition of claim 7, comprising castor oil or castor oil derivatives in a concentration of 1 to 2% by weight.

9. The composition of claim 1, wherein the anti-blocking agent comprises at least one of ethylene-bis(stearamide) (EBS wax), docosanamide, and magnesium stearate.

10. The composition of claim 9, wherein the EBS wax in a concentration of up to 18% by weight, docosanamide in a concentration of up to 12% by weight, or magnesium stearate in a concentration of up to 18% by weight.

11. The composition of claim 1, wherein the filler is a particulate filler.

12. The composition of claim 11, wherein the filler is selected from the group consisting of calcium carbonate and fumed silica.

13. The composition of claim 11, wherein the filler is a calcium carbonate that has been previously surface treated with stearic acid.

14. The composition of claim 11, wherein the particulate filler has a particle size range of 2 to 10 microns.

15. The composition of claim 11, wherein the particulate filler has a particle size range of 3 to 5 microns.

16. The composition of claim 11, wherein the particulate filler has a specific gravity of between 2 and 3.

17. The composition of claim 16, wherein the particulate filler has a specific gravity of between 2.3 and 2.7.

18. A composition of matter, comprising:
an organic binder comprising a silicone fluid;
an anti-blocking agent selected from the group consisting of stearic acid, ethylene-bis(stearamide)(EBS wax) in a concentration of up to 18% by weight, docosanamide in a concentration of up to 12% by weight, or magnesium stearate, in a concentration of up to 18% by weight or combinations thereof;
and a rheological additive; and
a filler.

19. The composition of claim 18, wherein the composition meets ASTM-D2203 standard test method for staining sealants.

20. The composition of claim 19, wherein the composition meets the ASTM-D2203 if two or fewer filter papers show evidence of staining.

* * * * *